(12) United States Patent
Signorino et al.

(10) Patent No.: US 10,663,159 B2
(45) Date of Patent: May 26, 2020

(54) LIGHTING DEVICE FOR FITTING INTO A WALL SURFACE OF A DOMESTIC ELECTRICAL APPLIANCE

(71) Applicant: emz-Hanauer GmbH & Co. KGaA, Nabburg (DE)

(72) Inventors: Manfredi Signorino, Wackersdorf (DE); Martin Brabec, Nabburg (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 0 days.

(21) Appl. No.: 16/026,247

(22) Filed: Jul. 3, 2018

(65) Prior Publication Data
US 2019/0011120 A1 Jan. 10, 2019

(30) Foreign Application Priority Data
Jul. 7, 2017 (DE) .......................... 10 2017 006 424

(51) Int. Cl.
| F25D 27/00 | (2006.01) |
| F21K 9/68 | (2016.01) |
| F21V 33/00 | (2006.01) |
| G02B 27/09 | (2006.01) |
| F21Y 115/10 | (2016.01) |

(52) U.S. Cl.
CPC ............ *F21V 33/0044* (2013.01); *F21K 9/68* (2016.08); *F25D 27/00* (2013.01); *F25D 27/005* (2013.01); *G02B 27/0977* (2013.01); *F21Y 2115/10* (2016.08)

(58) Field of Classification Search
CPC ...... F21V 33/0044; F21K 9/68; F25D 27/005; G02B 27/0977
See application file for complete search history.

(56) References Cited

U.S. PATENT DOCUMENTS

| 5,662,403 A | 9/1997 | Akashi et al. |
| 7,891,840 B1 * | 2/2011 | Kang ................ G02F 1/133603 362/249.02 |

(Continued)

FOREIGN PATENT DOCUMENTS

| KR | 10-2012-0045572 A | 5/2012 |
| KR | 10-2017-0037136 A | 4/2017 |

OTHER PUBLICATIONS

German search report from counterpart German Pat. Appl. No. 10 2017 006 424.5 dated Oct. 10, 2017.

(Continued)

*Primary Examiner* — Anabel Ton
(74) *Attorney, Agent, or Firm* — Robert R. Deleault, Esq.; Mesmer & Deleault, PLLC

(57) ABSTRACT

A lighting device for fitting into a wall surface of a domestic electrical appliance, in particular a refrigerator or/and freezer, includes a window pane for the emergence of light, a light source arrangement having at least one light-emitting diode, and a light reflection surface, arranged behind the window pane and irradiated by the light-emitting diode, for reflecting light in the direction towards the window pane. The light reflection surface has regions of different reflection behaviour, where in some embodiments the light reflection surface is divided into a glossy region closer to the light-emitting diode(s) and a scattering region further away from the light-emitting diode(s).

18 Claims, 2 Drawing Sheets

(56) References Cited

U.S. PATENT DOCUMENTS

| | | | |
|---|---|---|---|
| 7,905,636 B2 * | 3/2011 | Kosters | F21V 11/02 362/217.01 |
| 8,096,681 B2 * | 1/2012 | Fang | F21V 3/00 362/227 |
| 2008/0204888 A1 | 8/2008 | Kan et al. | |
| 2009/0316384 A1 * | 12/2009 | Kanayama | H01L 33/60 362/84 |
| 2010/0124064 A1 * | 5/2010 | Ogawa | F21S 8/04 362/307 |
| 2010/0157607 A1 | 6/2010 | Venhaus | |
| 2011/0038171 A1 | 2/2011 | Uchida | |
| 2012/0268962 A1 | 10/2012 | Uchida | |
| 2013/0141903 A1 * | 6/2013 | Rivas | F21V 13/04 362/218 |
| 2013/0208468 A1 | 8/2013 | Chen et al. | |
| 2013/0301262 A1 | 11/2013 | Li et al. | |
| 2018/0267223 A1 * | 9/2018 | Rodgers | G02B 5/0231 |

OTHER PUBLICATIONS

DE Office Action for counterpart application DE 10 2017 006 424.5, dated Nov. 4, 2019.

* cited by examiner

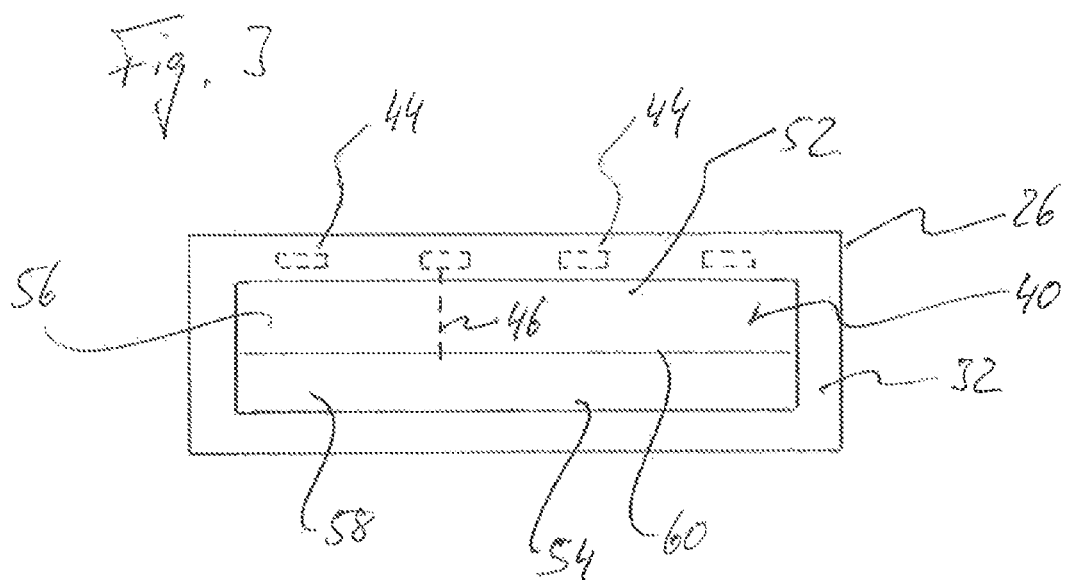
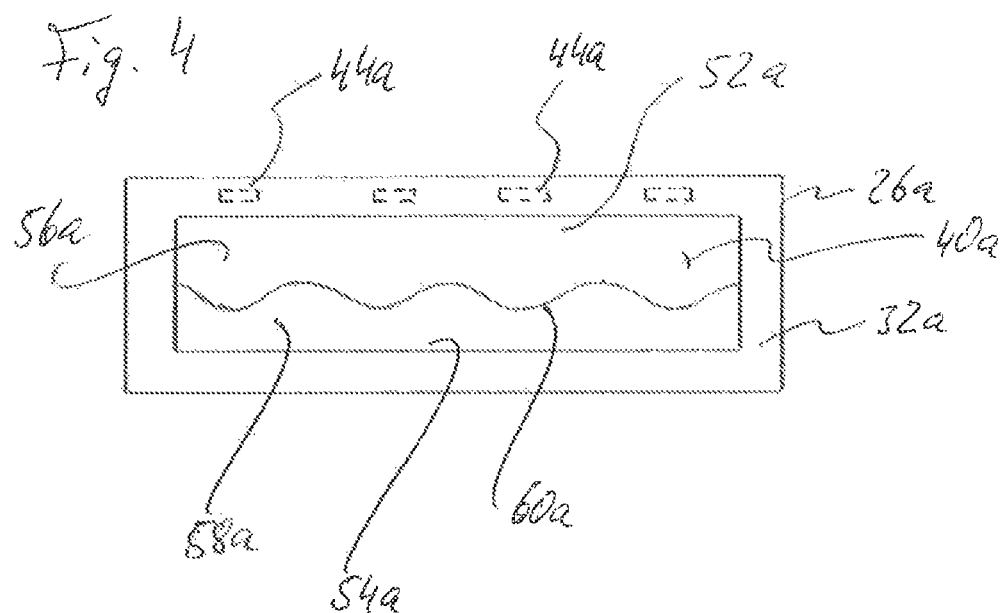

LIGHTING DEVICE FOR FITTING INTO A WALL SURFACE OF A DOMESTIC ELECTRICAL APPLIANCE

BACKGROUND OF THE INVENTION

1. Field of the Invention

The present invention relates generally to a lighting device for a domestic electrical appliance. Particularly, the present invention relates to a lighting device which is intended to be fitted into a wall surface of a domestic electrical appliance.

2. Description of the Prior Art

Domestic refrigerators frequently have one or more lighting devices by means of which the interior of the refrigerator is illuminated when the door is open so that a user is better able to see the articles stored therein. For aesthetic reasons, suitable lighting modules are sometimes fitted into a wall surface delimiting the interior of the refrigerator (e.g. at the sides or at the back), so that the user perceives the lighting module as an integral part of the wall surface in question. Because of their illuminating power and working life, light-emitting diodes have become increasingly important as the type of light source used in lighting devices for domestic appliances. In order to avoid dazzling the user, indirect solutions are often employed, in which the light-emitting diode(s) is or are not located in the immediate field of vision of the user when the user is standing in his normal use position in front of the domestic appliance. It has been found that, with such indirect solutions, when the user is looking at the lighting device he is nevertheless able to perceive so-called hotspots, that is to say places in which a very high luminous intensity is concentrated in points, which can interfere with the overall aesthetic impression.

SUMMARY OF THE INVENTION

The object of the invention is to provide a lighting device which is intended to be fitted into a wall surface of a domestic appliance, for example a refrigerator, and is successfully able to counteract the occurrence of the mentioned hotspots.

In order to achieve this object, the invention provides, in accordance with the provisions of independent claim 1, a lighting device for fitting into a wall surface of a domestic electrical appliance, in particular a refrigerator or/and freezer, comprising a window pane for the emergence of light, a light source arrangement having at least one light-emitting diode, and a light reflection surface, arranged behind the window and irradiated by the light-emitting diode, for reflecting light in the direction towards the window. According to the invention, the light reflection surface has regions of different reflection behaviour.

In the solution according to the invention, the configuration of the light reflection surface with regions of different reflection behaviour ensures that a portion of the light of the light-emitting diode that strikes the light reflection surface is reflected in a different way than another portion of that light. Thus, in a preferred embodiment, the light reflection surface comprises at least one smooth region and a least one region which has a diffusely scattering effect. In the smooth region, incident light is reflected directionally (or at least approximately directionally), while in the region of the light reflection surface which has a diffusely scattering effect, incident light is scattered non-directionally. By suitably arranging and configuring the regions of different reflection behaviour on the light reflection surface, the occurrence of undesirable hotspots which a user perceives when he looks at the window pane of the lighting device can be minimised or even largely eliminated.

A reduction in hotspots can in principle be achieved by configuring the window pane as a diffuser pane, for example by making it opaque or configuring it with a surface profile on the pane surface that has a scattering effect. The configuration according to the invention of the light reflection surface with regions of different reflection behaviour therefore makes it possible to dispense with such a configuration of the window pane as a diffuser pane and instead to make the window pane transparent. For the observer, the window pane then has the appearance of a clear pane through which he is able to see largely unhindered. It has been found that such a configuration of the window pane as a clear pane is often perceived by users to be more aesthetically pleasing than a diffuser pane. Nonetheless, it is of course not precluded within the context of the invention, in addition to configuring the light reflection surface with regions of different reflection behaviour, also to configure the window pane as a diffuser pane at least in some regions.

In some embodiments, the light reflection surface comprises regions having a diffusely scattering effect which have different scattering powers. For example, the various regions having a diffusely scattering effect can have different mean surface roughness. In other embodiments, on the other hand, the light reflection surface has the same scattering power, that is to say, for example, the same mean surface roughness, wherever it has a diffusely scattering effect.

In some embodiments, the light reflection surface with its regions of different reflection behaviour is formed on a one-piece continuous reflection body. The reflection body can be formed, for example, of a white plastics material. The reflection body can be produced by an injection moulding process, for example.

In some embodiments, the light-emitting diode is arranged with an angle of its main beam axis of ±30 degrees, better ±15 degrees, even better ±5 degrees, relative to the pane plane of the window pane. In these embodiments, when viewed in a section normal to the pane plane and containing the main beam axis of the light-emitting diode, the light reflection surface extends at least in some regions, and preferably continuously, in a curved form between a first end region, which is closer to the light-emitting diode and further away from the window pane, and a second end region, which is further away from the light-emitting diode and closer to the window pane. The light reflection surface thereby has a region of lower scattering power which is followed in the direction towards the second end region by a region of higher scattering power. The region of lower scattering power can, in particular, be a smooth region (glossy region) with directional or at least largely directional reflection.

In some embodiments, the light source arrangement comprises a plurality of light-emitting diodes arranged one behind the other in a row which is substantially parallel to the pane plane of the window pane. The light reflection surface hereby has at least two strip regions of different reflection behaviour extending in parallel side by side along the row of light-emitting diodes. The strip regions can be straight or alternatively they can have wavy strip longitudinal edges.

The invention is explained in greater detail below with reference to the accompanying drawings.

BRIEF DESCRIPTION OF THE DRAWINGS

FIG. 3 is a view, in schematic form, of a wall lighting module according to one embodiment, as seen from the observer's side.

FIG. 4 is a view corresponding to FIG. 3 for a wall lighting module according to a modified embodiment.

DETAILED DESCRIPTION OF THE INVENTION

Figure 1:
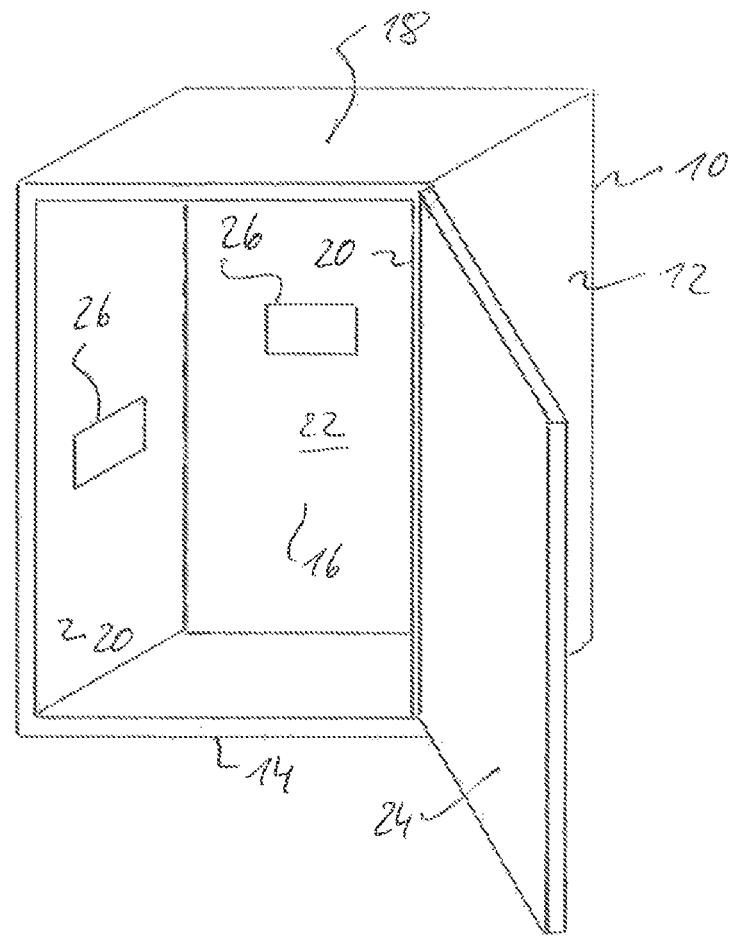
FIG. 1 is a highly schematic representation of a refrigerator having fitted wall lighting modules.

Reference will first be made to FIG. 1. The refrigerator shown therein is generally designated 10. It represents a electrical domestic appliance which can be equipped with a lighting device according to the invention. It will be appreciated that the present disclosure is not limited to the fitting of a lighting device according to the invention into a refrigerator. Other types of domestic appliance are equally as conceivable as the fitting site for a lighting device according to the invention, for example a freezer or an electric oven or a microwave oven, such as is used for rapidly heating foods, or an extractor hood which, when fitted overhead, is typically equipped with a lighting device for lighting the working region located beneath it.

The refrigerator 10 comprises a body 12 having a bottom wall 14, a rear wall 16, a top wall 18 and two mutually opposite side walls 20, which together delimit an interior 22 of the refrigerator 10. A door 24 is articulated with the body 12, by means of which door the interior 22, in which the food to be stored is kept, can be closed.

When the door is open (shown in FIG. 1), it is desirable to artificially illuminate the interior 22 in order to give the user a better view of the food located therein. To that end there is fitted into at least one of the walls 14, 16, 18, 20 at least one wall lighting module 26 which is so controlled that it is switched on and off in dependence on the opening and closing of the door 24. In the example shown, a wall lighting module 26 is fitted into the rear wall 16, and a further wall lighting module 26 is fitted into the left side wall 20 in the representation of FIG. 1. The wall lighting modules 26 are so fitted into the walls in question that they do not protrude, or protrude by only a comparatively small amount, beyond the wall surface of the wall in question that faces towards the interior 22, so that the user is given the impression that the wall lighting modules 26 are set substantially flush into the wall of the body 12. It will be appreciated that the distribution pattern of the wall lighting modules 26 shown in FIG. 1 is purely exemplary and can be changed as desired in respect of both the number and the position of the wall lighting modules 26. It will additionally be appreciated that the wall lighting modules 26 do not have to be the only lighting means with which the refrigerator 10 is equipped. In addition to the wall lighting modules 26, lighting means of different forms can be provided. Such lighting means of different forms are not subject-matter of the present disclosure and therefore do not require any further explanation.

Figure 2:
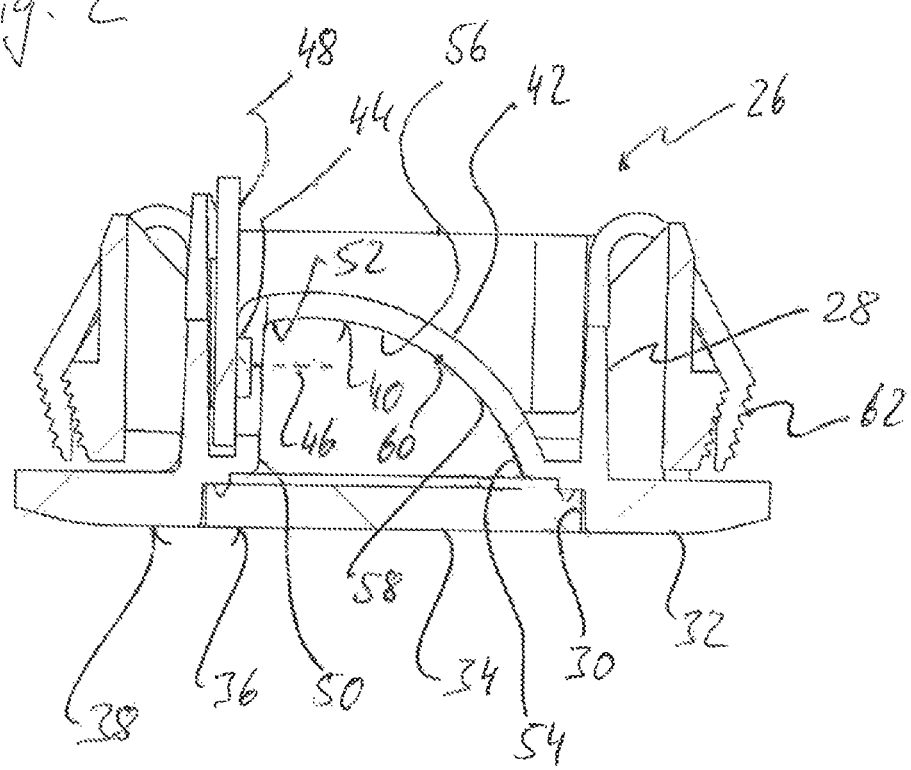
FIG. 2 is a sectional view of a wall lighting module according to one embodiment.

For further details of the wall lighting modules 26, reference will now additionally be made to FIG. 2, which shows one of the lighting modules 26 in section. The wall lighting module 26 comprises a module housing 28 which forms a frame 32 running around a light outlet opening 30. The light outlet opening 30 has, for example, a contour similar to the shape of an elongate rectangle. In this case, the frame 32 also has a substantially rectangular frame shape. The light outlet opening 30 is closed by a transparent window pane 34, that is to say a window pane which gives a clear view, which is set into the frame 32 and is adhesively bonded thereto, for example. The front side of the pane, designated 36 in FIG. 2, which faces towards the interior 22 of the refrigerator 10, is substantially flush with the front frame side, designated 38, of the frame 32 facing towards the interior 22. From the point of view of the observer, the wall lighting module 26 has a light reflection surface 40 behind the window pane 34, which light reflection surface is formed in the example shown on a reflection body 42 produced in one piece, for example by injection moulding. Owing to the clear-view property of the window pane 34, the light reflection surface 40 is clearly visible to an observer through the window pane 34. Although it is in principle not precluded to form the light reflection surface 40 at least in part of metal, it is in some embodiments formed wholly of a plastics surface, in particular, a white plastics surface. When the reflection body 42 is manufactured from a plastics material, an additional metallisation step is then not required to produce the light reflection surface 40.

The wall lighting module 26 further comprises a light source arrangement having at least one light-emitting diode 44, which is arranged with its main beam axis (designated 46) substantially parallel to the pane plane of the window pane 34. The main beam axis 46 is the axis on which the emission pattern of the light-emitting diode 44 has the greatest irradiation intensity. Typically, the emission pattern of the light-emitting diode 44 has a main lobe with an opening angle of, for example, more than 90 degrees or more than 120 degrees or more than 150 degrees, whereby there may in some circumstances also be one or more side lobes. It is therefore not necessary for the main beam axis 46 of the light-emitting diode 44 to be exactly parallel to the pane plane of the window pane 34. Deviations of, for example, up to ±5 degrees or ±10 degrees from exact parallelism are readily acceptable.

In some embodiments, the light source arrangement comprises not a single light-emitting diode 44 but a plurality of such light-emitting diodes 44 which are arranged spaced apart one behind the other in a row, in particular a straight row, parallel to the pane plane of the window pane 34 (see in this respect FIGS. 3 and 4). The or each light-emitting diode 44 is mounted on a circuit board 48, which in the example shown is inserted into the module housing 28 with its board plane oriented perpendicularly with respect to the pane plane of the window pane 34, and held therein. In the case of a viewing direction perpendicular to the pane plane of the window pane 34, the or each light-emitting diode 44 is not directly visible but is concealed behind a housing portion 50 of the module housing 28. The or each light-emitting diode 44 is therefore situated outside or in any case at the edge of the part of the light reflection surface 40 that is visible through the window pane 34 in the case of a viewing direction perpendicular to the pane plane of the window pane 34.

In a view in the sectional plane of FIG. 2 (this sectional plane contains the main beam axis 46 of the light-emitting diode 44), the light reflection surface 40 extends curved in an arcuate manner between a first end region 52 and a second end region 54. The first end region 52 is closer to the light-emitting diode 44 than the second end region 54, which is further away from the light-emitting diode 44. At the same time, the light reflection surface 40 is at a greater distance from the window pane 34 at its first end region 52 than at its second end region 54. The run of the light reflection surface 40 between the first end region 52 and the second end region 54 can follow, for example, a parabola or a spline or any conical curve generally.

In some embodiments, the curvature of the light reflection surface 40 does not change in a direction perpendicular to the plane of the drawing of FIG. 2, that is to say the light reflection surface 40 always has the same curvature between the first end region 52 and the second end region 54 in any sectional plane parallel to the main beam axis 46 of the light-emitting diode 44 and normal to the pane plane of the window pane 34.

Over the distance between the first end region 52 and the second end region 54, the light reflection surface 40 does not have the same reflecting power everywhere. Instead, the light reflection surface 40 is divided over that distance into at least two regions of different light reflection behaviour, whereby the reflection behaviour changes abruptly in at least one discrete step in some embodiments, while in other embodiments it has a continuous, stepless change. In the simplest case, the distance between the first end region 52 and the second end region 54 of the light reflection surface 40 is divided into a total of two regions 56, 58 which adjoin one another at a separating line 58 which is indicated graphically in FIG. 2 by a thick point. The region 56 is in the form of a glossy region and causes light which strikes the glossy region 56 to be reflected directionally. The region 58, on the other hand, is in the form of a scattering region, which causes light incident thereon to be scattered diffusely. The mean surface roughness of the light reflection surface 40 is greater by a multiple in the scattering region 58 than it is in the glossy region 56. For example, the mean surface roughness (arithmetic mean roughness value Ra) in the scattering region 58 can be at least approximately 1.0 µm or at least approximately 2.0 µm or at least approximately 2.5 µm or at least approximately 2.8 µm or at least approximately 3.2 µm (corresponding approximately to a roughness value of at least approximately 20 or at least approximately 26 or at least approximately 28 or at least approximately 30 according to guideline VDI 3400: VDI: Verein Deutscher Ingenieure [association of German engineers]). By contrast, the glossy region 56 can have a 60° value of, for example, at least 60 GU or at least 65 GU or at least 70 GU and consequently form a medium-gloss or high-gloss surface (GU: gloss unit).

When the reflection body 42 is manufactured by injection moulding, the surface of the reflection body 42 may already have sufficient gloss to form the glossy region 56 as a direct result of the injection moulding process. However, it is of course possible also to carry out a separate polishing operation after the injection moulding operation in order to increase the surface gloss in the glossy region 56. The increased surface roughness desired to form the scattering region 58 can be achieved, for example, by treatment by means of electrical discharge machining or by an etching treatment.

The glossy region 56 extends from the first end region 52 of the light reflection surface 40 to the separating line 60, while the scattering region 58 extends from the separating line 60 to the second end region 54. During operation of the lighting module 26, a portion of the light emitted by the or each light-emitting diode 44 into the space between the light reflection surface 40 and the window pane 34 falls directly onto the glossy region 56, while another portion falls onto the scattering region 58. Added to these are components of light which, from the or each light-emitting diode 44, first strike the window pane 34 directly and are there reflected in the direction towards the light reflection surface 40 by total reflection. After total reflection at the window pane 34, a considerable portion of these light components strikes the scattering region 58.

By suitably configuring the width of the glossy region 56 and of the scattering region 58 and the position of the or each light-emitting diode 44 relative to the light reflection surface 40, it is possible to minimise the occurrence of hotspots which an observer perceives when he looks at the window pane 34 of the wall lighting module 26. It has been found that without the scattering region 58, that is to say when the light reflection surface 40 is in the form of a glossy surface throughout, such hotspots are noticeable to a much greater degree.

FIG. 3 shows a form in which the separating line 60 between the glossy region 56 and the scattering region 58 is straight. The glossy region 56 and the scattering region 58 are accordingly strip regions with straight strip longitudinal edges, these strip regions extending along the row of light-emitting diodes 44.

In the variant according to FIG. 4, in which identical components are provided with identical reference numerals as before but with the addition of a lowercase letter, the separating line 60a is wavy. The strip regions formed by the glossy region 56a and the scattering region 58a accordingly have a wavy strip longitudinal edge where they meet.

Again with reference to FIG. 2, the module housing 28 of the wall lighting module 26 is provided with suitable snap and/or locking structures 62 which allow the wall lighting module 26 to be inserted into a mounting recess (not shown in detail in the figures) in the wall in question (e.g. 16 or 20) of the refrigerator 10 and to be fixed securely therein via a snap and/or locking connection.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A lighting device for fitting into a wall surface of a domestic electrical appliance, in particular a refrigerator or freezer, the lighting device comprising:
   a window pane for the emergence of light;
   a light source arrangement having at least one light-emitting diode; and
   a light reflection surface, arranged behind the window pane and irradiated by the light-emitting diode, for reflecting light in the direction towards the window pane, wherein the light reflection surface has regions of different reflection behaviour;
   wherein the light-emitting diode is arranged with an angle of its main beam axis relative to the pane plane of the window pane; and
   wherein the light reflection surface having at least one curved region extending between a first end region and a second end region.

2. The lighting device according to claim 1, wherein the light reflection surface has at least one smooth region and at least one region with a diffusely scattering effect.

3. The lighting device according to claim 1, wherein the light reflection surface has regions with a diffusely scattering effect of different scattering power.

4. The lighting device according to claim 1, wherein the light reflection surface with its regions of different reflection behaviour is formed on a one-piece continuous reflection body.

5. The lighting device according to claim 4, wherein the reflection body is formed by a white plastics material.

6. The lighting device according to claim 1, wherein the window pane is transparent.

7. A lighting device for fitting into a wall surface of a domestic electrical appliance, the lighting device comprising:
   a window pane for the emergence of light;
   a light source arrangement having at least one light-emitting diode; and
   a light reflection surface, arranged behind the window pane and irradiated by the light-emitting diode, for reflecting light in the direction towards the window pane, wherein the light reflection surface has regions of different reflection behaviour,
   wherein the light-emitting diode is arranged with an angle of its main beam axis of between +30 degrees to −30 degrees relative to the pane plane of the window pane, and, when viewed in a section normal to the pane plane and containing the main beam axis of the light-emitting diode, the light reflection surface extends at least in some regions in a curved form between a first end region, which is closer to the light-emitting diode and further away from the window pane, and a second end region, which is further away from the light-emitting diode and closer to the window pane, and wherein the light reflection surface has a region of lower scattering power which is followed in the direction towards the second end region by a region of higher scattering power.

8. The lighting device according to claim 7, wherein the light reflection surface extends continuously at least in some regions.

9. The lighting device according to claim 1, wherein:
   the light-emitting diode is arranged with the angle of its main beam axis in a range between +15 degrees to −15 degrees relative to the pane plane of the window pane, and, when viewed in the section normal to the pane plane and containing the main beam axis of the light-emitting diode, the light reflection surface extends at least in some regions in the curved form between:
   the first end region, which is closer to the light-emitting diode and further away from the window pane, and
   the second end region, which is further away from the light-emitting diode and closer to the window pane; and
   the light reflection surface has a region of lower scattering power which is followed in the direction towards the second end region by a region of higher scattering power.

10. The lighting device according to claim 9, wherein the light reflection surface extends continuously at least in some regions.

11. The lighting device according to claim 1, wherein the light-emitting diode is arranged with the angle of its main beam axis in a range between +5 degrees to −5 degrees relative to the pane plane of the window pane, and, when viewed in the section normal to the pane plane and containing the main beam axis of the light-emitting diode, the light reflection surface extends at least in some regions in the curved form between:
   the first end region, which is closer to the light-emitting diode and further away from the window pane, and
   the second end region, which is further away from the light-emitting diode and closer to the window pane;
   wherein the light reflection surface has a region of lower scattering power which is followed in the direction towards the second end region by a region of higher scattering power.

12. The lighting device according to claim 11, wherein the light reflection surface extends continuously at least in some regions.

13. A lighting device for fitting into a wall surface of a domestic electrical appliance, the lighting device comprising:
   a window pane for the emergence of light;
   a light source arrangement having at least one light-emitting diode; and
   a light reflection surface, arranged behind the window pane and irradiated by the light-emitting diode, for reflecting light in the direction towards the window pane, wherein the light reflection surface has regions of different reflection behaviour,
   wherein the light source arrangement comprises a plurality of light-emitting diodes arranged one behind the other in a row which is substantially parallel to the pane plane of the window pane, and the light reflection surface has at least two strip regions of different reflection behaviour extending in parallel side by side along the row of light-emitting diodes.

14. The lighting device according to claim 13, wherein the strip regions have straight or wavy strip longitudinal edges.

15. The lighting device according to claim 1, wherein the light-emitting diode is arranged with the angle of its main beam axis in a range of between +30 degrees to −30 degrees.

16. The lighting device according to claim 1, wherein the first end region is closer to the light-emitting diode and further away from the window pane; the second end region is further away from the light-emitting diode and closer to the window pane; and the light reflection surface has a region of lower scattering power which is followed in the direction towards the second end region by a region of higher scattering power.

17. The lighting device according to claim 7, wherein the light-emitting diode is arranged with the angle of its main beam axis in a range of between +15 degrees to −15 degrees.

18. The lighting device according to claim 7, wherein the light-emitting diode is arranged with the angle of its main beam axis in a range of between +5 degrees to −5 degrees.

* * * * *